(12) United States Patent
Deshpande et al.

(10) Patent No.: US 10,332,131 B2
(45) Date of Patent: *Jun. 25, 2019

(54) DEVELOPMENT OF DYNAMIC BUSINESS DATA BASED ON MOVING SPATIOTEMPORAL PHENOMENA AND EVENTS

(71) Applicant: INTERNATIONAL BUSINESS MACHINES CORPORATION, Armonk, NY (US)

(72) Inventors: Ajay A. Deshpande, White Plains, NY (US); Kimberly D. Hendrix, New Albany, OH (US); Herbert S. McFaddin, Yorktown Heights, NY (US); Chandra Narayanaswami, Wilton, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 356 days.

This patent is subject to a terminal disclaimer.

(21) Appl. No.: 14/742,870

(22) Filed: Jun. 18, 2015

(65) Prior Publication Data

US 2015/0287055 A1 Oct. 8, 2015

Related U.S. Application Data

(63) Continuation of application No. 14/529,936, filed on Oct. 31, 2014.
(Continued)

(51) Int. Cl.
*G06Q 30/02* (2012.01)
*G06Q 50/00* (2012.01)

(52) U.S. Cl.
CPC ..... *G06Q 30/0201* (2013.01); *G06Q 30/0206* (2013.01); *G06Q 30/0269* (2013.01); *G06Q 50/01* (2013.01)

(58) Field of Classification Search
CPC .......................................... G06Q 10/00–50/00
(Continued)

(56) References Cited

U.S. PATENT DOCUMENTS

2002/0133385 A1* 9/2002 Fox ........................ G06Q 10/06
705/7.28
2007/0214023 A1* 9/2007 Mathai .................... G01W 1/00
705/4

(Continued)

OTHER PUBLICATIONS

List of IBM Patents or Patent Applications Treated as Related; Date Filed: Jun. 18, 2015, 2 pages.
(Continued)

*Primary Examiner* — Alan S Miller
*Assistant Examiner* — Arif Ullah
(74) *Attorney, Agent, or Firm* — Cantor Colburn LLP; Grant Johnson

(57) ABSTRACT

Embodiments are directed to a computer implemented method of developing data for use by a business system. The method includes identifying, by a processor circuit, an occurrence having at least one characteristic that changes over time. The method further includes determining, by the processor circuit, a pattern of the change over time, wherein the pattern includes past changes and expected future changes. The method further includes identifying, by the processor circuit, a plurality of associations among data of an offering, data of a potential consumer and the pattern of the at least one characteristic's change over time. The plurality of associations also change over time, and the data for use by the business system is derived from the plurality of associations that change over time.

7 Claims, 6 Drawing Sheets

Related U.S. Application Data

(60) Provisional application No. 61/897,915, filed on Oct. 31, 2013.

(58) Field of Classification Search
USPC .......................................................... 705/7.29
See application file for complete search history.

(56) References Cited

U.S. PATENT DOCUMENTS

| | | | |
|---|---|---|---|
| 2013/0073336 A1* | 3/2013 | Heath .................... | G06Q 30/02 705/7.29 |
| 2013/0179227 A1* | 7/2013 | Booth ................ | G06Q 30/0201 705/7.35 |
| 2015/0120599 A1 | 4/2015 | Deshpande et al. | |

OTHER PUBLICATIONS

Appendix P, List of IBM Patents or Patent Applications Treated as Related dated Jul. 30, 2015.

Ajay A. Deshpande, "Development of Dynamic Business Data for Marketing to Moving Spatiotemporal Phenomena and Events" U.S. Appl. No. 14/529,936, filed Oct. 31, 2014.

Ajay A. Deshpande, "Partner Marketing and Order Fulfillment Based on Partner Merchant Shipping Efficiencies" U.S. Appl. No. 14/742,758, filed Jun. 18, 2015.

Ajay A. Deshpande, "Customer Purchasing Preference Profiles Based on Coupon Choices" U.S. Appl. No. 14/745,707, filed Jun. 22, 2015.

Ajay A. Deshpande, "Pop-Up Store Logistics Management System" U.S. Appl. No. 14/745,670, filed Jun. 22, 2015.

Ajay A. Deshpande, et al; U.S. Appl. No. 14/510,636; "Logistics Management System for Determining Pickup Routesfor Retail Stores"; filed Oct. 9, 2014.

Ajay A. Deshpande, "Logistics Management System for Determining Pickup Routes for Retail Stores" U.S. Appl. No. 14/745,687, filed Jun. 22, 2015.

Ajay A. Deshpande, "Customer Purchasing Preference Profiles Based on Coupon Choices" U.S. Appl. No. 14/510,643, filed Oct. 9, 2014.

Ajay A. Deshpande, "Partner Marketing Based on an Expected Customer Visit" U.S. Appl. No. 14/742,763, filed Jun. 18, 2015.

Ajay A. Deshpande, "Partner Marketing Based on an Expected Customer Visit" U.S. Appl. No. 14/529,925, filed Oct. 31, 2014.

Ajay A. Deshpande, "Pop-Up Store Logistics Management System" U.S. Appl. No. 14/510,632, filed Oct. 9, 2014.

\* cited by examiner

DEVELOPMENT OF DYNAMIC BUSINESS DATA BASED ON MOVING SPATIOTEMPORAL PHENOMENA AND EVENTS

DOMESTIC PRIORITY

The present application claims priority to U.S. Non-provisional patent application Ser. No. 14/529,936 titled "DEVELOPMENT OF DYNAMIC BUSINESS DATA FOR MARKETING TO MOVING SPATIOTEMPORAL PHENOMENA AND EVENTS" filed on Oct. 31, 2014, which claims the benefit of provisional patent application Ser. No. 61/897,915, titled "SYSTEM AND METHOD FOR MARKETING TO MOVING SPATIAL-TEMPORAL PHENOMENA AND EVENTS," filed Oct. 31, 2013, assigned to the assignee hereof and expressly incorporated by reference herein.

BACKGROUND

The present disclosure relates in general to the development of dynamic business data that support a variety of business processes, such as marketing systems, merchandising systems, and others. More specifically, the present disclosure relates to systems and methodologies for determining how a spatiotemporal occurrence influences consumer preferences as the occurrence moves and changes over time, thereby enabling the planning, development and execution of dynamic business strategies that anticipate and closely link to the occurrence and consumer preferences as the occurrence and consumer preferences both move and change over time.

A wide variety of occurrences (e.g., natural phenomena, events, etc.) are capable of influencing a consumer's preferences and/or purchasing behavior in a wide variety of industries, including grocery, food & drink, pharmaceuticals, apparel, travel & leisure, home & garden, energy and automotive. For example, in weather-based advertising merchants attempt to deliver advertisements and/or promotions that correspond to weather conditions experienced by the consumer. Examples include 4×4 SUV advertisements targeted to areas experiencing icy or snowy weather, or antihistamines advertisements targeted to areas where there is a high pollen count.

Conventional marketing strategies have supported marketing toward spatiotemporal occurrences on a very broad or long-lived scale, such as marketing to weather on a seasonal or climatic basis. Concurrently marketers have increasingly greater data at hand as to how consumers respond to such occurrences. For example, the marketer may have data that shows that when it is cold and rainy in zone 4, the sales of boots increase by 50 percent. In many cases providers of weather information provide APIs (application programming interfaces) that enable advertising, marketing and related applications to receive alerts and triggers when weather conditions in specific localities change in such a way as to meet pre-specified criteria. Weather-based advertising is typically implemented through the integration of such weather APIs into business advertising platforms. These integrations can yield email marketing, SMS & push notifications, mobile ads, web displays, video ads and digital out-of-home signage (DOOH). Weather APIs can also be integrated into the back-end of ecommerce websites to synchronize promotions and offers with local weather events.

SUMMARY

Embodiments are directed to a computer implemented method of developing data for use by a business system. The method includes identifying, by a processor circuit, an occurrence having at least one characteristic that changes over time. The method further includes determining, by the processor circuit, a pattern of the change over time, wherein the pattern includes past changes and expected future changes. The method further includes identifying, by the processor circuit, a plurality of associations among data of an offering, data of a potential consumer and the pattern of the at least one characteristic's change over time. The plurality of associations also change over time, and the data for use by the business system is derived from the plurality of associations that change over time.

Embodiments are further directed to a computer program product for developing data for use by a business system. The computer program product includes a computer readable storage medium having program instructions embodied therewith, wherein the computer readable storage medium is not a transitory signal per se. The program instructions are readable by a processor circuit to cause the processor circuit to perform a method. The method includes identifying, by a processor circuit, an occurrence having at least one characteristic that changes over time. The method further includes determining, by the processor circuit, a pattern of the change over time, wherein the pattern includes past changes and expected future changes. The method further includes identifying, by the processor circuit, a plurality of associations among data of an offering, data of a potential consumer and the pattern of the at least one characteristic's change over time. The plurality of associations also change over time, and the data for use by the business system is derived from the plurality of associations that change over time.

Embodiments are further directed to a computer system for developing data for use by a business system. The computer system is configured to identify an occurrence having at least one characteristic that changes over time. The computer system is further configured to determine a pattern of the change over time, wherein the pattern includes past changes and expected future changes. The system is further configured to identify a plurality of associations among data of an offering, data of a potential consumer and the pattern of the at least one characteristic's change over time. The plurality of associations also change over time, and the data for use by the business system is derived from the plurality of associations that change over time.

Additional features and advantages are realized through techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
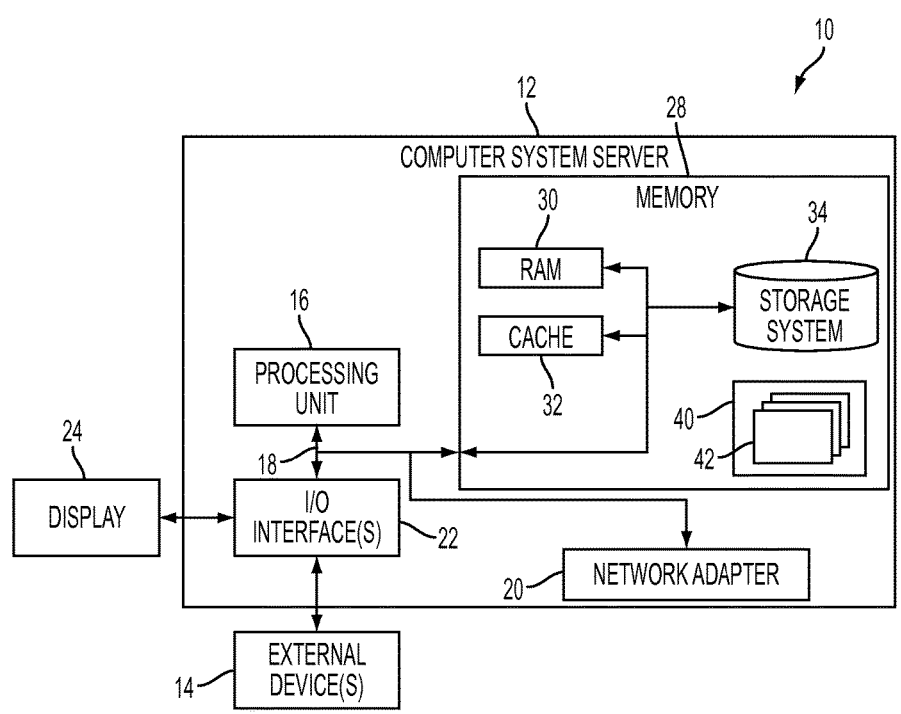
FIG. 1 depicts a cloud computing node according to one or more embodiments.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Turning now to a description of a cloud computing environment capable of implementing and/or supporting the present disclosure, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
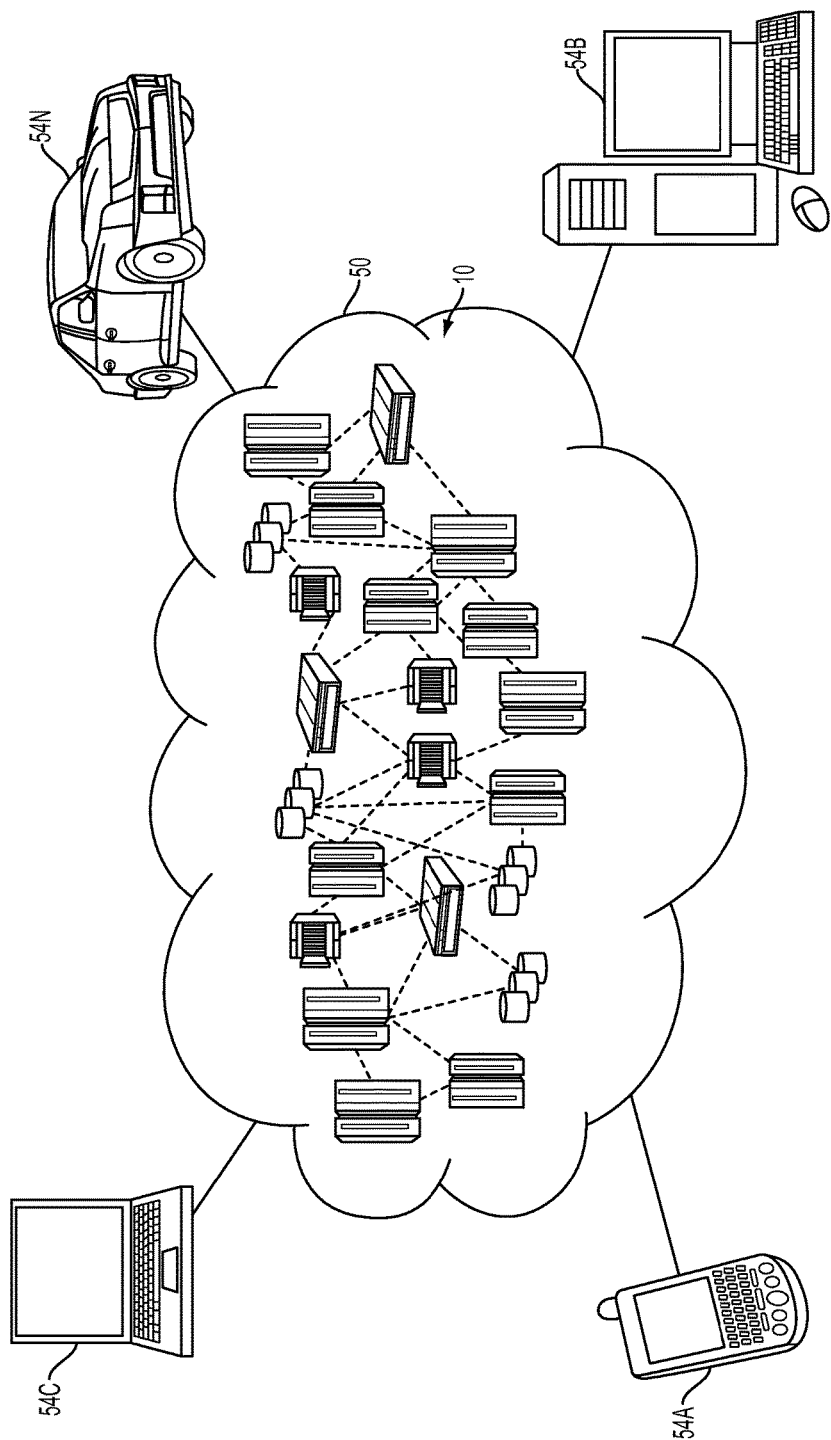
FIG. 2 depicts a cloud computing environment according to one or more embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
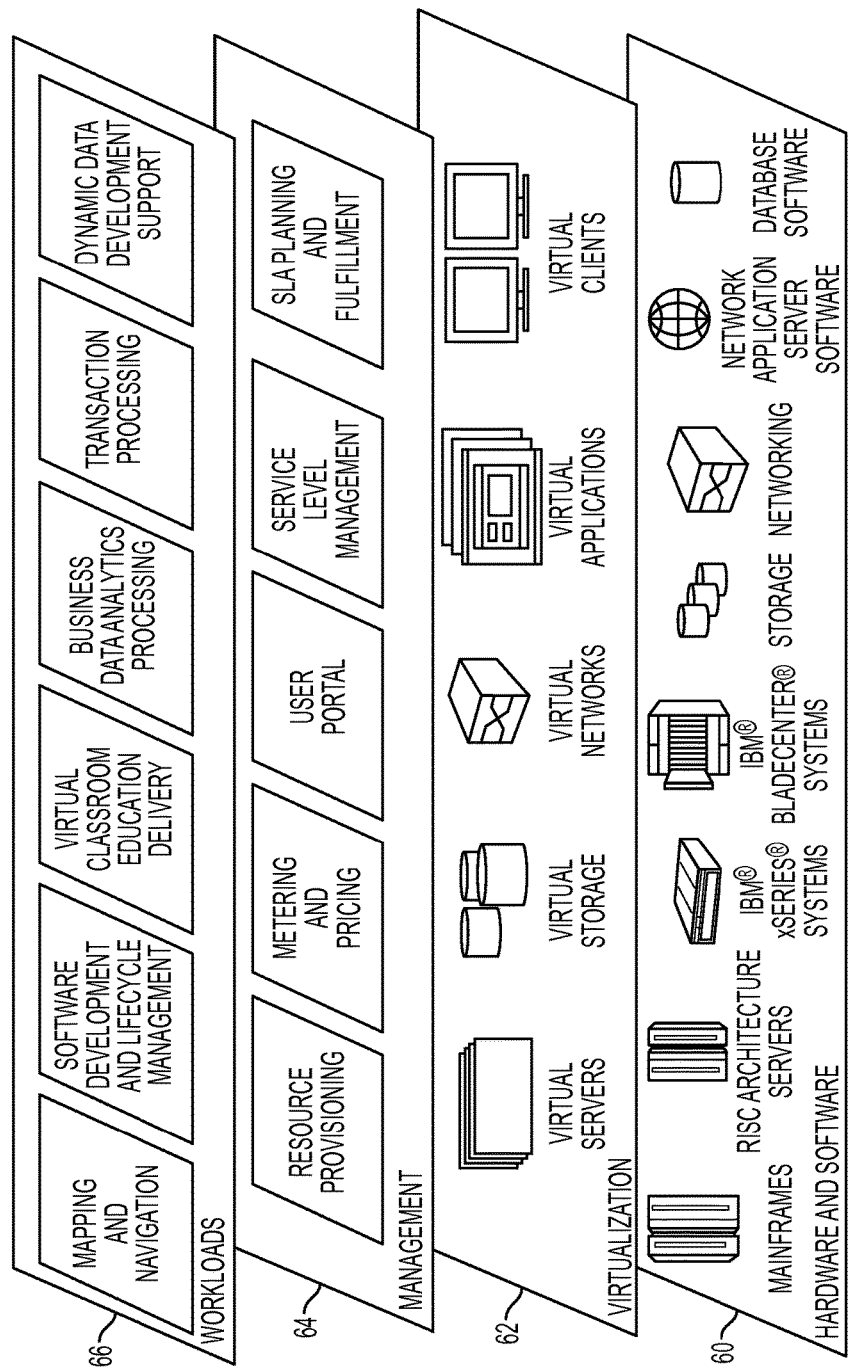
FIG. 3 depicts abstraction model layers according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Figure 6:
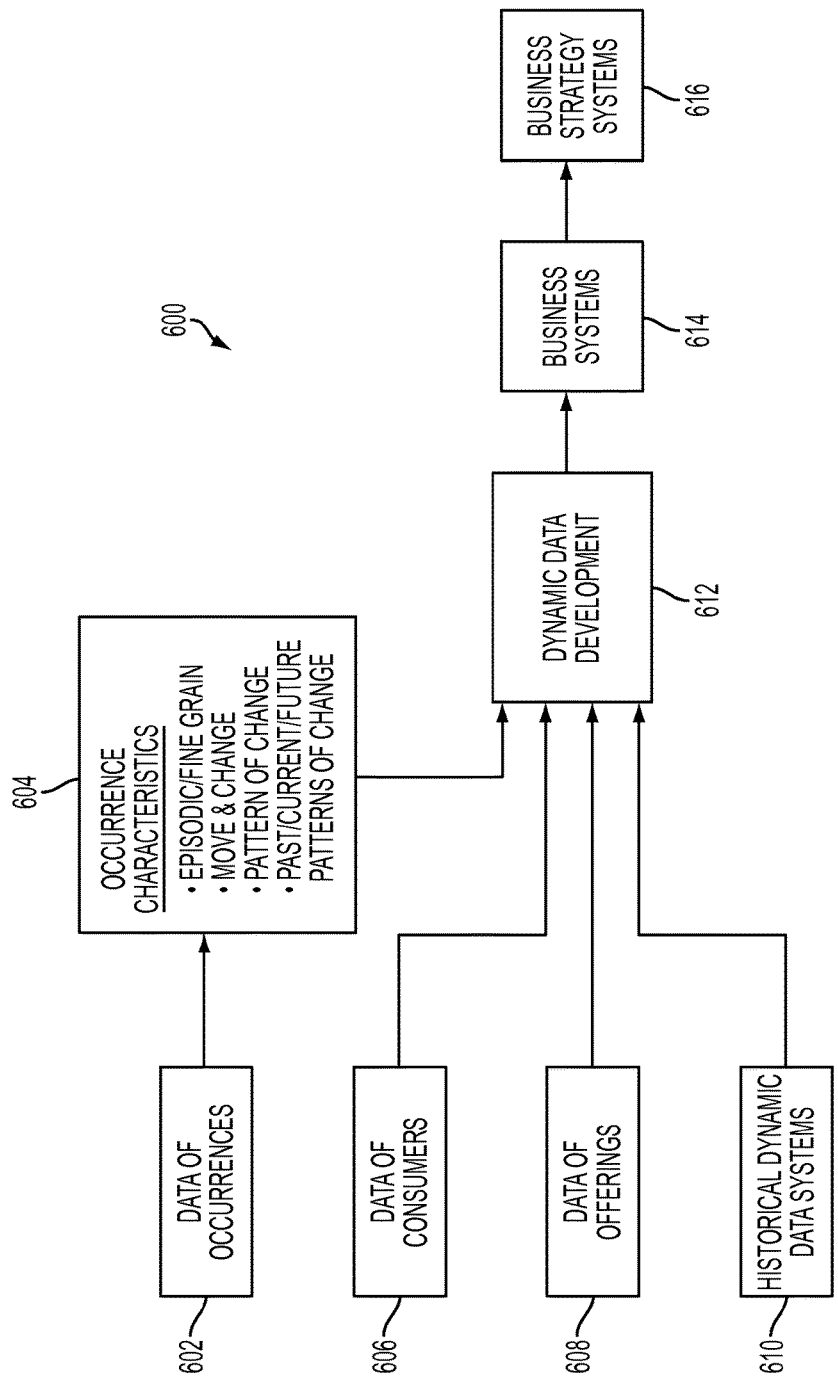
FIG. 6 depicts a more general diagram of a dynamic data development system and methodology according to one or more embodiments.

Workloads layer 66 provides examples of functionality for which the cloud computing environment may be utilized. Examples of workloads and functions which may be provided from this layer include: mapping and navigation; software development and lifecycle management; virtual classroom education delivery; business data analytics processing; transaction processing; and a wide variety of support activities for developing dynamic data for use in business systems such as marketing systems, merchandising systems, and others. Preferably, the dynamic data include the identification and development of associations among data of an offering, data of a consumers, and characteristics of spatiotemporal occurrences that move and change over time. An example of a workload 66 that may be implemented and/or supported by cloud computing environment 50 and nodes 10 is a dynamic data development system 600, which is illustrated in FIG. 6 and described in greater detail later in this disclosure.

As previously noted, a wide variety of occurrences (e.g., natural phenomena, events, etc.) are capable of influencing a consumer's preferences and/or purchasing behavior in a wide variety of industries, including grocery, food & drink, pharmaceuticals, apparel, travel & leisure, home & garden, energy and automotive. For example, in weather-based advertising merchants attempt to deliver advertisements and/or promotions that correspond to weather conditions experienced by the consumer. Examples include 4×4 SUV advertisements targeted to areas experiencing icy or snowy weather, or antihistamines advertisements targeted to areas where there is a high pollen count.

Conventional marketing strategies have supported marketing toward spatiotemporal occurrences on a very broad or long-lived scale, such as marketing to weather on a seasonal or climatic basis. Concurrently marketers have increasingly greater data at hand as to how consumers respond to such occurrences. For example, the marketer may have data that shows that when it is cold and rainy in zone 4, the sales of boots increase by 50 percent. In many cases providers of weather information provide APIs that enable advertising, marketing and related applications to receive alerts and triggers when weather conditions in specific localities change in such a way as to meet pre-specified criteria. Weather-based advertising is typically implemented through the integration of a such weather APIs into business advertising platforms. These integrations can yield email marketing, SMS & push notifications, mobile ads, web displays, video ads and digital out-of-home signage (DOOH). Weather APIs can also be integrated into the back-end of ecommerce websites to synchronize promotions and offers with local weather events.

The present disclosure enables entities (e.g., individuals, businesses and other organizations) to market to spatiotemporal occurrences at an episodic and/or fine grain level. As used in the present disclosure, the term episodic refers to breaking occurrences into component parts, and the terms fine grain refer to breaking occurrences into increasingly detailed components parts. As used in the present disclosure, the term occurrence refers broadly to phenomena and/or events that are analyzed at an episodic and/or fine grain level. Thus, an occurrence may be anything that changes and moves over time such that past, current and predicted evolution of the occurrence can be plotted on a map. The ability to do so can provide an advantage to merchants. For example, the present disclosure and disclosed embodiments provide a dynamic data identification and development system to enable merchants to market different clothing to cold or warm fronts, or to market home supplies based upon storms or hurricanes. Using the present disclosure, entities can identify specific instances or classes of episodic phenomena and target marketing messages/strategies and/or merchandising strategies to those phenomena. The present disclosure further enables entities to plan for, anticipate and respond to the change pattern of occurrences that move and change over time. The present disclosure further enables entities to address occurrences that have very small time scales (e.g., a storm that lasts four hours in a particular area).

The present disclosure further enables entities to model a spatiotemporal occurrence as a whole rather than the more narrow view such as its local effects. In other words, the present disclosure enables entities to market to a well-defined construct such as a "hurricane", or a "cold front" rather than marketing to isolated variables such as "sales of boots in Westchester County seem to rise by 1 percent when the temperature falls by 4 degrees. Examples of occurrences (e.g., natural phenomena, events, etc.) that change and/or move over time and may be modeled by the present disclosure include but are not limited to, hurricanes, snow storms, cold/warm fronts, local events, high pollen counts, an influenza outbreak, bug populations and movements, and others. The present disclosure enables entities to describe and parameterize the occurrence of interest, for example, a storm's size and severity over time, path of movement, expected duration, etc.

The present disclosure further enables entities to classify potential consumer sets that can be affected by the occurrence, such as consumers in a direct storm path, consumers within a vicinity of a storm path, or consumers who live near a sporting event. The present disclosure further enables entities to examine historical occurrences and correlate past displacements in demand due to the occurrence. Entities can use the present disclosure to construct marketing/merchandising responses to the occurrence. Entities can then relate those strategies to an actual predicted course of the occurrence and apply those strategies to a consumer set.

Turning now to an overview of the present disclosure, one or more disclosed embodiments provide systems and methodologies for developing dynamic data for use by a business system. The systems and methodologies include identifying an occurrence (e.g., a natural phenomenon or an event) having at least one characteristic (e.g., a location or a severity) that changes over time. A pattern of the changes in occurrence characteristics over time is identified, wherein the pattern of change over time includes past changes and expected future changes. The systems and methodologies further include identifying a plurality of associations among data of an offering, data of a potential consumer and the pattern of change over time. Data of an offering may include a wide variety of data about offerings. As used in the present disclosure, the term offering refers broadly to any product or service offered to the public. As used in the present disclosure, offering also encompasses a solicitation for participation, for example a solicitation to volunteer for a political campaign or apply for employment. The plurality of associations also change over time, and the dynamic data developed for use by the business system is derived from the identified plurality of associations that change over time. The dynamic data used by the business system may include an affinity of the potential consumer for the offering.

The disclosed systems and methodologies may further include identifying a plurality of historical associations among historical data of other offerings, historical data of other potential consumers and historical patterns of characteristics of historical occurrences that changed and moved over time. The plurality of historical associations result from previous iterations of the disclosed systems and methodologies for developing dynamic data. The dynamic data developed for use by the business system is further derived from the plurality of historical associations. The disclosed systems and methodologies, and particularly the plurality of historical associations, may be implemented and supported by a cloud computing environment.

The business system of the disclosed systems and methodologies may include business marketing systems that develop and deliver messages for the potential consumer based on at least one of the identified plurality of associations. The business system of the disclosed systems and methodologies may further include a business merchandising system that develops inventory and pricing strategies based on at least one of the identified plurality of associations.

Figures 4, 5:
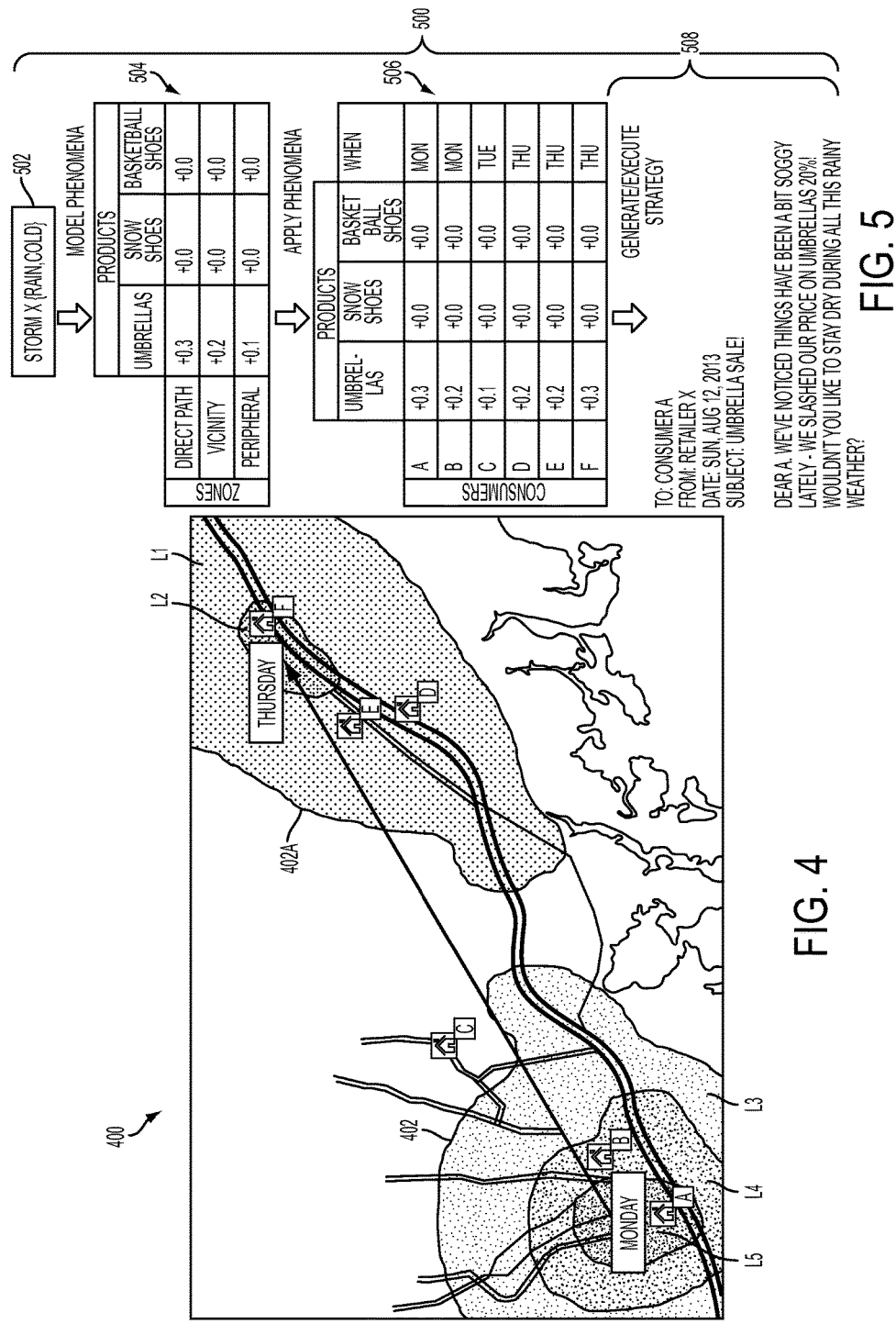
FIG. 4 depicts a map illustrating a portion of a dynamic data development system and methodology according to one or more embodiments.
FIG. 5 depicts a diagram further illustrating the example dynamic data development system and methodology shown in FIG. 1.

Turning now to a more detailed description of the present disclosure, FIGS. 4 and 5 illustrate one embodiment a dynamic data development system of the present disclosure. More specifically, FIG. 4 illustrates a pattern of change over time for a storm (i.e., an occurrence) 402, 402A plotted on a map 400, and FIG. 5 illustrates a methodology 500 showing how a dynamic data development system of the present disclosure may be applied to the changing storm pattern shown on map 400 in FIG. 4.

In the example shown in FIGS. 4 and 5, it is assumed that a storm 402, 402A is forecast to move through an area over 4 days from MONDAY to THURSDAY, and ABC Home Goods store desires to develop a focused marketing and merchandising strategy that anticipates and is closely coupled to the storm's pattern of change over time. For ease of illustration, the storm's path is shown in FIG. 4 at two snapshots in time, namely the expected location and intensities of the storm on MONDAY and the expected location and intensities of the storm on THURSDAY. In practice, the storm's pattern of change (e.g., changes in intensity and/or location) over time may be developed to as much detail as desired. It is forecast that on MONDAY, storm 402 will cover a particular area of map 400 and have at least three levels of intensity shown by L5, L4 and L3. It is also forecast that on THURSDAY, storm 402 will evolved to storm 402A that will now cover a new area as shown and have at least two levels of intensity shown by L2 and L1. Six consumers, who are potential or existing customer households of ABC Home Goods, are shown in FIG. 4 at A-F. A wide variety of data about the existence and nature of consumer households in the vicinity of storm 402, 402A is known and available. For its existing/past customers, ABC Home Goods will have details about the composition of consumer households, income, purchasing habits, buying power, credit worthiness, etc.

FIG. 5 illustrates a methodology 500 that may be derived from map 400 shown in FIG. 4. Methodology 500 develops a model of storm 402, 402A (shown in FIG. 4). Block 502 models storm 402, 402A according to certain attributes, which are shown in block 502 as rain and cold. At block 504, a response model is developed for storm 402, 402A. The response model at block 504 is shown as a matrix having rows and columns. Along the top row are listed selected product categories of ABC Home Goods. Multiple actual products may correspond to each category. Along the leftmost column are zones relative to the location of the storm, which are shown as "Direct Path" (i.e., in a direct path of the storm's highest intensity), "Vicinity" (i.e., within the vicinity of the storm's highest intensity) and "Peripheral" (i.e., on the periphery of the storm's highest intensity). Plotted within the matrix squares of block 504 are numbers that represent a projection of how the different zones are expected to impact a particular consumer's affinity for the listed product. Thus, for consumers (e.g., Consumers A and F) in the "Direct Path" zone, it is expected that their affinity for umbrellas will increase by 30 percent, their affinity for snow shoes will be unchanged, and their affinity for basketball shoes will be unchanged. For consumers (e.g., Consumer B, D, and E) in the "Vicinity" zone, it is expected that their affinity for umbrellas will increase by 20 percent, their affinity for snow shoes will be unchanged, and their affinity for basketball shoes will be unchanged. For consumers (e.g., Consumer C) in the "Peripheral" zone, it is expected that their affinity for umbrellas will increase by 10 percent, their affinity for snow shoes will be unchanged, and their affinity for basketballs will be unchanged.

The affinity scores may be derived from a variety of sources, including historical purchasing data, intuition, and previous iterations of methodology 500. More specifically, previous iterations of methodology 500 include the accumulation of actual changes in actual sales data that are identified and developed by an application of methodology 500. The accumulation of actual change in sales data may also result from the application of methodology 500 to data of storms that have already occurred. Using actual sales data, the actual changes in affinity scores can be identified and stored for later use during subsequent iterations of methodology 500. Hence, by developing and incorporating actual observed changes in affinity scores that result from applications of methodology 500, the predictive accuracy of affinity scores developed under methodology 500 for a given occurrence in a given location for a given existing/potential consumer set can be improved. Thus, the predictive accuracy of methodology 500 can be further refined until a desire level of detail is reached. For example, the predictive accuracy of methodology 500 can be further refined to reveal that the expected affinity increase for umbrellas in the direct zone is actually 32 percent, and a plot of the expected affinity increase over time shows that the highest sales are expected from noon to 6:00 pm on the Sunday before the storm arrives on MONDAY.

Methodology 500 moves to block 506 where the matrix model developed at block 504 is applied to potential/existing Consumers A-F to develop a schedule for each potential/ existing consumer around storm 402, 402A, the consumer's zone and the changes in storm's predicted location. The schedule at block 506 is abbreviated to show only the expected highest affinity change for each consumer over the 4 day period from MONDAY to THURSDAY. Optionally, block 506 could be expanded to plot the expected changes in affinity scores for each consumer/product for the 4 day period. The schedule at block 506 is shown as a table having rows and columns. Along the top row are listed each selected product of ABC Home Goods, along with a "when" column showing the date on which that consumer will be affected by the storm. Along the leftmost column are listed, individually, each of Consumers A-F. Under the Umbrellas column are listed the expected change in affinity scores for umbrellas for each consumer. Under the Snow Shoes column are listed the expected change in affinity scores for snow shoes for each consumer. Under the Basketball Shoes column are listed the expected change in affinity scores for basketball shoes for each consumer. In the "When" column are listed the dates on which the storm is expected to affect each listed consumer. Thus, the table at block 506 shows that it is expected, for example, that Consumer A's affinity for umbrellas is expected to increase by 30 percent on MONDAY. Likewise, Consumer B's affinity for umbrellas is expected to increase by 20 percent on MONDAY. Consumer C's affinity for umbrellas is expected to increase by 10 percent on TUESDAY. Consumer D's affinity for umbrellas is expected to increase by 20 percent on THURSDAY. Consumer E's affinity for umbrellas is expected to increase by 20 percent on THURSDAY. Consumer F's affinity for umbrellas is expected to increase by 30 percent on THURSDAY. The expected consumer affinities for snow shoes and basketball shoes are expected to be unchanged.

With the data developed at blocks 504, 506, methodology 500 moves to block 508, which uses the dynamic data to derive and execute a marketing and/or merchandising strategy. Block 508 illustrates an example of an email communication that may be generated and sent to Consumer A on Sunday, Aug. 12, 2013, which is one day before Consumer A's affinity for umbrellas is expected to reach 30 percent. The email warns Consumer A of the upcoming storm, and notifies Consumer A that ABC Home Goods store is currently running a sale on umbrellas. Similar emails are developed for Consumers B-F, and may be customized based on the dynamic data developed under methodology 500 for each consumer.

FIG. 6 depicts a more general diagram of a dynamic data development system 600 according to one or more embodiments. In general, dynamic data development system 600 includes data of occurrences 602, occurrence characteristics 604, data of consumers 606, data of offerings 608, historical dynamic data systems 610, dynamic data development 612, business systems 614 and business strategy systems 616, configured and arranged as shown. As used in the present disclosure, the term occurrences refers broadly to virtually anything having spatiotemporal characteristics that can change and move over time. Examples include but are not limited to natural phenomena such as earthquakes, volcano eruptions, hurricanes, tornadoes, storms, cold fronts, heat waves, fog, pollen counts, bug infestations, diseases, droughts, heavy rains, flooding, and others. Additional examples include but are not limited to events such as sports, concerts, movie releases, elections, conventions, rallies, meetings, conflicts, holidays, issues, topics, social media activities, hiring, layoffs, economic trends, pollution levels and others.

Data of occurrences 602 may be a wide variety data types from a wide variety of sources. Such data may include past, current and future occurrence data. Many sources of occurrence data exist. The U.S. government and private companies maintain and make available databases with details about past, current and future occurrences. Examples include but are not limited to the National Oceanic and Atmospheric Administration's (NOOA) National Weather Service, AccuWeather, Thomson Reuters Datastream, CDC (Center for Disease Control), NIH (National Institute for Health), IBM Cognos® Consumer Insight (CCI) (a social media monitoring tool), Sporting Schedules of NFL, NBA, MLB, European Soccer League, and others. The teachings of the present disclosure are capable of being implemented in conjunction with any type of occurrence data source now known or later developed.

Occurrence characteristics 604 refer broadly to any spatiotemporal occurrence characteristic that changes and moves over time. Preferably, the past, current and predicted changes and movements of the spatiotemporal characteristics are identified and organized at an episodic and/or fine grain level such that patterns of the past, current and predicted changes and movements over time can be identified. The occurrence characteristics 604 can include the anticipated spatiotemporal location and time, as well as the anticipated path of the phenomena and its shape (spatial extents). Additionally the occurrence characteristics 604 can include parametric information about the phenomena such as the intensity (e.g. hurricane force levels) or type (snow, ice, rain, mix, etc.) or other technical features such as temperature, humidity, etc. The identified patterns of change may be represented visually for ease of communication. An example of a visual representation of a pattern of changes in spatiotemporal characteristics of an occurrence is illustrated by map 400 shown in FIG. 4. Occurrence characteristics 604 may be developed to a desired level of detail. For example, map 400 may developed to the two snapshots (e.g., episodic level) of the storm's status on MONDAY and THURSDAY as shown in FIG. 4, or to hourly snapshots (e.g., a more fine grain level) of the storm's status from 5:00 a.m. on MONDAY through 9:00 p.m. on THURSDAY (not shown). Occurrence characteristics 604 may also include simplifications such as the division of the intensity levels into three groupings, "Direct Path", "Vicinity" and "Peripheral." Another example is a flu epidemic that originates in one area and spreads to other areas due to customer travel patterns. The spatiotemporal movement of the event is computed using virus transmission characteristics, population travel patterns, and the response to existing flu vaccination campaigns in areas where the flu is currently concentrated. The intensity of the epidemic may further take into account the demographics of the area and the immunization levels. For example, areas with high populations of young children and senior citizens would be considered high intensity areas—suggesting a more aggressive immunization campaign for that area. A low intensity area would be an area where the population is sparse, and the immunity levels are historically higher.

Data of consumers 606 include a wide variety of data about consumers, which include both past and current customers of a subject company. Many sources of consumer data exist. Companies maintain details about their past and current customers, including but not limited to the composition of customer households, income, purchasing habits, buying power, credit worthiness, and others. Other companies (e.g., Acxiom®, Experian® and others) maintain databases containing both aggregate and individual household information such as household income, length of residency, education levels, credit worthiness, social graphs and others. The teachings of the present disclosure are capable of being implemented in conjunction with any type of consumer data source now known or later developed.

Data of offerings 608 may include a wide variety of data about offerings. As used in the present disclosure, the term offering refers broadly to any product or service offered to the public. As used in the present disclosure, the term offering also encompasses a solicitation for participation, for example a solicitation to volunteer for a political campaign or apply for employment. Many sources of offering data exist. Companies maintain details about past, current and expected future offerings in a wide variety of industries, including grocery, food & drink, pharmaceuticals, apparel, travel & leisure, home & garden, energy and automotive. An example of offering data includes but is not limited to the sales data. Offering data often exists in enterprise resource planning (ERP) systems, R&D product lifecycle management (PLM) systems, spreadsheets and personal databases. Offering data are utilized in varying environments and contexts such as for detailed product descriptions with pricing info in product catalogs or for size and weight data for calculating freight costs in a logistics department. The teachings of the present disclosure are capable of being implemented in conjunction with any type and/or source of offering data now known or later developed.

Historical dynamic data 610 and dynamic data development 612 will now be described. Historical dynamic data 610 include historical iterations of dynamic data development 612. Dynamic data development 612 develops and identifies associations among data of occurrences 602 (via occurrence characteristics 604), data of consumers 608, data of offerings 608 and, optionally, historical dynamic data 610. Historical dynamic data 610 is developed, identified and accumulated from past associations identified and developed among data of other relevant offerings, data of other relevant potential consumers, and characteristics of other relevant spatiotemporal occurrences that move and change over time. In addition to resulting from past applications of dynamic data development 612, historical dynamic data 610 may also result from applications of dynamic data development 612 to relevant occurrences that have already happened. When dynamic data development 612 is applied to relevant occurrences that have already happened, there is the opportunity to accumulate, instead of predicted associations, actual associations that occurred among data of other relevant offerings, data of other relevant potential consumers, and characteristics of other relevant spatiotemporal occurrences that move and change over time. For example, as applied to the previously described specific example shown in FIGS. 4 and 5, methodology 500 can incorporate historical affinity scores (i.e., an association among data of other relevant offerings, data of other relevant potential consumers, and characteristics of other relevant spatiotemporal occurrences that move and change over time) that are used to accumulate, instead of predicted affinity scores, actual affinity scores derived from actual changes in actual sales data that are revealed by an application of methodology 500. By developing and incorporating changes in actual affinity scores, the predictive accuracy of affinity scores developed for a given occurrence in a given location for a given existing/potential consumer set can be improved. For example, as previously noted, by incorporating actual changes to affinity scores, the predictive accuracy of methodology 500 can be further refined to reveal that a better, more fine grain prediction of the affinity increase for umbrellas in the direct zone is actually 32 percent, and a plot of the expected affinity increase over time shows that the highest sales are expected from noon to 6:00 pm on the Sunday before the storm arrives on MONDAY.

Business systems 614 can include a wide variety of business processes and/or functions including but not limited marketing systems, merchandising systems, supply chain systems, and others. Business systems 614 receive the associations identified by dynamic data development 612 and use the associations to develop business strategies 616. Thus, the associations identified and developed by dynamic data development 612 enable business systems 614 and business strategies 616 to plan and execute dynamic business strategies that anticipate and closely link to the identified associations. Business systems 614 and business strategy systems 616 correspond to block 508 of methodology 500 in the previously described specific example shown in FIG. 5. As noted above, block 508 uses the dynamic data to derive and execute a marketing and/or merchandising strategy. For the FIG. 5 example, the email communication shown at 508 would be generated by business strategy 616 shown in FIG. 6.

The illustrated components of dynamic data development system 600, specifically data of occurrences 602, occurrence characteristics 604, data of consumers 606, data of offerings 608, historical dynamic data systems 610, dynamic data development 612, business systems 614 and business strategy systems 616, may each be implemented as a general-purpose computing systems, an example of which is the previously described cloud computing node 10 shown in FIG. 1. As previously noted, although this disclosure includes a detailed description on cloud computing, implementation of the teachings recited herein are not limited to a cloud computing environment. Rather, the illustrated components (602-616) of dynamic data development system 600 are capable of being implemented in conjunction with any other type of computing environment now known or later developed. Thus, cloud computing node 10 is only one example of a suitable implementation of the components (602-616) of dynamic data development system 600 and is not intended to suggest any limitation as to the scope of use or functionality of embodiments described herein. Regardless, cloud computing node 10 is capable of being implemented and/or performing any of the functionality of dynamic data development system 600.

Figure 7:
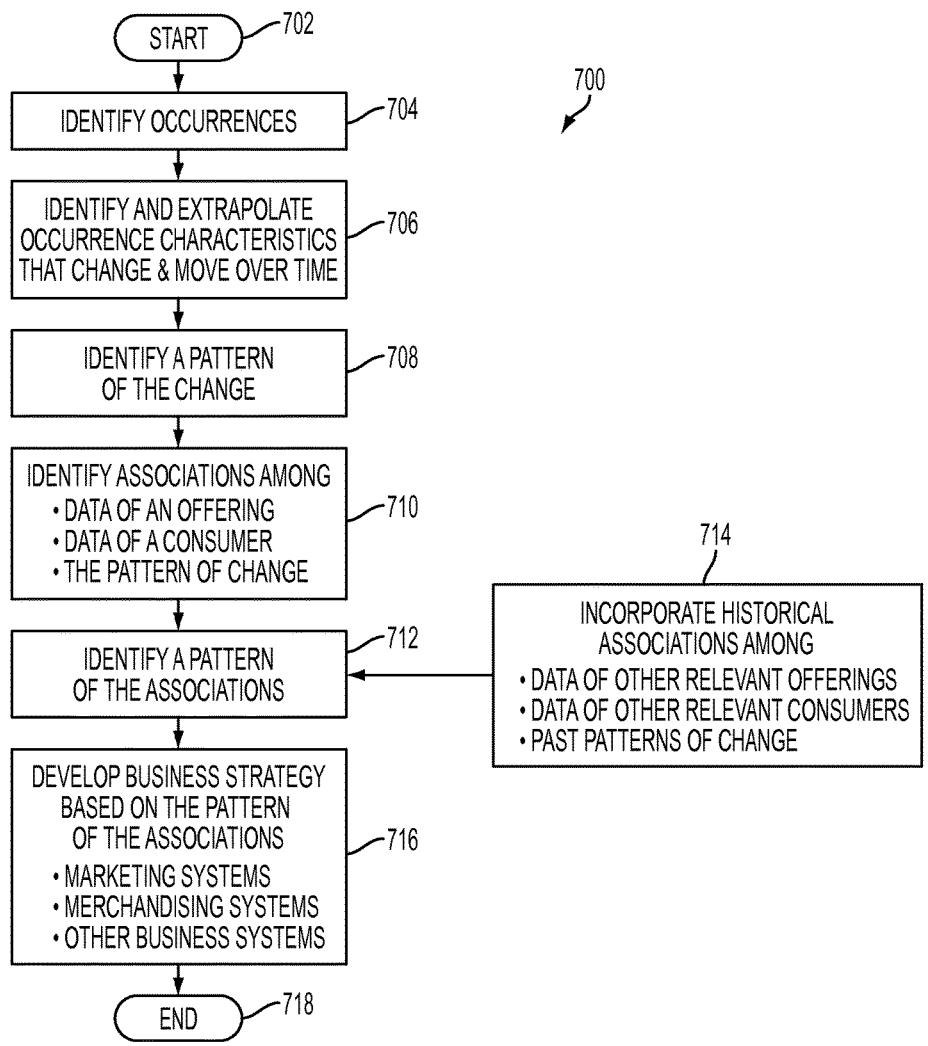
FIG. 7 is a flow diagram illustrating a methodology according to one or more embodiments.

FIG. 7 is a flow diagram illustrating a methodology 700 according to one or more embodiments. Methodology 700 begins at block 702 and moves to block 704 to identify occurrences. At block 706, occurrence characteristics that move and change over time are identified and extrapolated. The occurrence characteristics of block 706 correspond to occurrence characteristics 604 shown in dynamic data development system 600 of FIG. 6. As with occurrence characteristics 604, occurrence characteristics of block 706 refer broadly to any spatiotemporal occurrence characteristic that changes and moves over time. At block 708, the past, current and predicted changes and movements of the spatiotemporal characteristics are identified and organized at an episodic and/or fine grain level such that patterns of the past, current and predicted changes and movements over time can be identified. The patterns of change identified at block 708 may be represented visually for ease of communication. An example of a visual representation of block 708 is the pattern of change over time of storm 402, 402A illustrated by map 400 of FIG. 4.

Block 710 identifies associations among data of an offering, data of a consumer and the patterns of changes in occurrence characteristics. The establishment of the associations 710 can be done by conventional matching algorithms. Block 712 identifies a pattern of the associations identified at block 710. An example of the pattern of associations identified at block 712 is the change in affinity scores developed at blocks 504, 506 of FIG. 5. Block 712 optionally incorporates via block 714 historical associations identified among data of other relevant offerings, data of other relevant potential consumers, and characteristics of other relevant spatiotemporal occurrences that move and change over time. Blocks 710 and 712 correspond to the functionality of dynamic data development 612 shown in FIG. 6. Block 714 corresponds to the functionality of historical dynamic data system 610 shown in FIG. 6.

Block 716 develops business strategies based on the patterns of associations identified at block 712. An example business strategy of block 716 is block 508 of FIG. 5 wherein, based on forecasted changes in affinity scores (e.g., patterns of associations), an email communication is generated and sent to Consumer A on Sunday, Aug. 12, 2013, which is one day before Consumer A's affinity for umbrellas is expected to reach 30 percent. Block 716 corresponds to the functionality of business systems 614 and business strategies 616 shown in FIG. 6. Methodology ends at block 718.

Thus, it can be seen from the forgoing detailed description that embodiments of the present disclosure include the identification and development of dynamic data to support the planning, targeting and implementation of business systems (e.g., marketing systems, merchandising systems, etc.). In general, one or more disclosed embodiments relate to systems and methodologies for identifying and developing dynamic data that can support business process infrastructure such as marketing systems, merchandising systems, and others. Preferably, the identification and development of dynamic data include the identification and development of associations among at least data of an offering, data of a potential consumer, and patterns of change to characteristics of spatiotemporal occurrences. Optionally, the dynamic data may further include historical dynamic data developed, identified and accumulated from past associations identified and developed among data of other relevant offerings, data of other relevant potential consumers, and past patterns of change to characteristics of other relevant spatiotemporal occurrences. More specifically, one or more disclosed embodiments relate to systems and methodologies for developing dynamic consumer and/or product data derived from episodic and/or fine grain analysis of occurrences that move and change over time, thereby enabling the planning and execution of business processes and systems that anticipate and closely link to such occurrences.

It can also be seen from the forgoing detailed description that technical benefits of the present disclosure include systems and methodologies that enable entities (e.g., individuals, businesses and other organizations) to market to spatiotemporal occurrences at an episodic and/or fine grain level. As used in the present disclosure, an occurrence is anything that changes and moves such that past, current and predicted evolution of the occurrence over time can be plotted on a map. The ability to do so can provide an advantage to merchants. For example, the present disclosure and disclosed embodiments provide a dynamic data identification and development system to enable merchants to market different clothing to cold or warm fronts, or to market home supplies based upon storms or hurricanes. Using the present disclosure, entities can identify specific instances or classes of episodic phenomena and target marketing messages/strategies and/or merchandising strategies to those phenomena. The present disclosure further enables entities to plan for, anticipate and respond to the change pattern of occurrences. The present disclosure further enables entities to anticipate and respond effectively to occurrences that have very small time scales (e.g., a storm that lasts four hours in a particular area).

The present disclosure enables entities to model a spatiotemporal occurrence as a whole rather than the more narrow view such as its local effects. In other words, the present disclosure enables entities to market to a well-defined construct such as a "hurricane" or a "cold front" rather than market to isolated variables such as "sales of boots in Westchester County seem to rise by 1 percent when the temperature falls by 4 degrees. Examples of occurrences (e.g., natural phenomena, events, etc.) that change and/or move over time and may be modeled by the present disclosure include but are not limited to, hurricanes, snow storms, cold/warm fronts, local events, high pollen counts, an influenza outbreak, bug populations and movements, and others. The present disclosure enables entities to describe and parameterize the occurrence of interest, for example, a storm's size, and severity over time, path of movement, expected duration, etc.

The present disclosure further enables entities to classify potential consumer sets that can be affected by the occurrence, such as consumers in a direct storm path vs. consumers in a vicinity of the storm, or consumers who live near a sporting event. The present disclosure further enables entities to examine historical occurrences and correlate past displacements in demand due to the occurrence. Entities may use the present disclosure to construct marketing/merchandising responses to the occurrence. Entities may then relate those strategies to an actual predicted course of the occurrence and apply those strategies to a consumer set.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method of generating a weather-based application program interface (API) developing data for use by an electronic communications system, the computer implemented method comprising:

receiving, by said processor circuit, episodic occurrence data representing an episode of a spatiotemporal natural phenomenon occurrence having at least one characteristic that changes over time;

receiving, by said processor circuit, data of offerings and data of consumers;

receiving, by said processor circuit, historical episodic occurrence data representing historical episodes of spatiotemporal natural phenomenon occurrences having at least one characteristic that changes over time;

using the episodic occurrence data, the historical episodic occurrence data, the data of the offerings, and the data of the consumers to generate a model of the episode of the spatiotemporal natural phenomenon occurrence;

wherein the model includes:

pattern data that represents a pattern of said change in the episode of the spatiotemporal natural phenomenon over time, wherein said pattern comprises past changes and expected future changes;

and affinity data representing how an affinity of the consumers for the offerings is impacted by the episode of the spatiotemporal natural phenomenon occurrence;

applying the data of the consumers to the model to classify the consumers into a set of categories comprising:

impacted consumers who will be impacted by the episode of the spatiotemporal natural phenomenon;

a time range of when the impacted consumers will be impacted by the episode of the spatiotemporal natural phenomenon;

and time-based affinity data representing an affinity of the impacted consumers for the offerings during the time range when the impacted consumers will be impacted by the episode of the spatiotemporal natural phenomenon;

wherein using the classified data of the consumers and the set of categories as parameters for the generation of a weather-based API configured to interface with the electronic communications system to enable generation of alerts based on the classified data of the consumers and the set of categories;

wherein the alerts comprise communications that are transmitted to the impacted consumers during the time range when the impacted consumers will be impacted by the episode of the spatiotemporal natural phenomenon;

wherein said data of said consumer comprises at least one of a social graph and a household composition.

2. The computer implemented method of claim 1, wherein said data of said consumer comprises a location.

3. The computer implemented method of claim 1, wherein said at least one characteristic comprises at least one of a severity, a spatiotemporal characteristic, a coverage area and an expected duration.

4. The computer implemented method of claim 1, wherein the data for use by the electronic communications system comprises an affinity of said at least one potential consumer for said offering.

5. The computer implemented method of claim 1, wherein the computer implemented method further comprises using historical models to generate the model of the episode of the spatiotemporal natural phenomenon occurrence, wherein the historical models result from previous iterations of the computer implemented method.

6. The computer implemented method of claim 1, wherein said historical models are stored by a cloud computing environment.

7. The computer implemented method of claim 1, wherein the alerts are selected from a group consisting of emails, short message service (SMS) notifications, push notifications, mobile advertisements, web displays, and video advertisements.

* * * * *